(12) United States Patent
Maciolek et al.

(10) Patent No.: US 12,411,965 B1
(45) Date of Patent: Sep. 9, 2025

(54) SYSTEM AND METHOD FOR MAINTAINING REAL ESTATE DATA IN A SECURE MANNER

(71) Applicant: UIPCO, LLC, San Antonio, TX (US)

(72) Inventors: Michael J. Maciolek, Kerrville, TX (US); Timothy Frank Davison, San Antonio, TX (US); Donnette L. Moncrief Brown, San Antonio, TX (US); Bryan J. Osterkamp, New Braunfels, TX (US); Kori Rochelle Newman, San Antonio, TX (US); Brian Francisco Shipley, Plano, TX (US); Eric David Schroeder, San Antonio, TX (US); Robert Wiseman Simpson, Fair Oaks Ranch, TX (US); Manfred Amann, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 260 days.

(21) Appl. No.: 17/555,959

(22) Filed: Dec. 20, 2021

Related U.S. Application Data

(60) Provisional application No. 63/128,211, filed on Dec. 21, 2020.

(51) Int. Cl.
*G06F 21/62* (2013.01)
*G06Q 50/16* (2012.01)
*H04L 9/40* (2022.01)

(52) U.S. Cl.
CPC ......... *G06F 21/6218* (2013.01); *G06Q 50/16* (2013.01); *H04L 63/107* (2013.01)

(58) Field of Classification Search
CPC .... G06F 21/6218; G06Q 50/16; H04L 63/107
(Continued)

(56) References Cited

U.S. PATENT DOCUMENTS

| 5,584,025 A | * | 12/1996 | Keithley | G06Q 30/00 707/913 |
| 2002/0038223 A1 | * | 3/2002 | Niitsuma | G06Q 50/16 709/218 |

(Continued)

OTHER PUBLICATIONS

Islam, "The Internet of Things for Health Care: A Comprehensive Survey", 2015, IEEE, pp. 678-703 (Year: 2015).*

(Continued)

*Primary Examiner* — Taghi T Arani
*Assistant Examiner* — Gregory A Lane
(74) *Attorney, Agent, or Firm* — Plumsea Law Group, LLC

(57) ABSTRACT

The embodiments provide a system and method for maintaining real estate data in a secure manner. Access to the data for a given real estate property is restricted by using an authentication device that is physically located at the same real estate property. The authentication device may provide a rolling authentication code that can be entered by the user requesting access to the data. In another embodiment, access to the data for a given real estate property is restricted by using a real estate data unit that is physically stored on the premises. Access to the data may therefore be restricted to users who are close enough to connect with the data unit via wired or wireless communication methods. The data unit and/or authentication device may include a device housing and an installation portion. The installation portion may be configured to attach to part of a building and/or lot.

6 Claims, 12 Drawing Sheets

(58) Field of Classification Search
USPC .......................................................... 726/28
See application file for complete search history.

(56) References Cited

U.S. PATENT DOCUMENTS

| | | | |
|---|---|---|---|
| 2004/0181695 A1* | 9/2004 | Walker | H04L 63/08 726/4 |
| 2010/0115612 A1* | 5/2010 | O'Brien | G06F 21/41 726/22 |
| 2011/0093158 A1 | 4/2011 | Theisen | |
| 2013/0024918 A1* | 1/2013 | Cramer | H04L 9/3231 726/6 |
| 2013/0332578 A1 | 12/2013 | Carroll | |
| 2015/0101063 A1* | 4/2015 | Shimokawa | H04L 63/107 726/28 |
| 2016/0323267 A1* | 11/2016 | Sun | H04W 12/086 |
| 2018/0158255 A1 | 6/2018 | Garcia | |
| 2019/0325154 A1* | 10/2019 | Divakaran | G06F 21/6245 |
| 2020/0366669 A1* | 11/2020 | Gupta | G06K 19/06028 |
| 2021/0012018 A1* | 1/2021 | Porter | G08B 13/00 |
| 2021/0319639 A1* | 10/2021 | Ho | G06F 21/31 |
| 2021/0350336 A1 | 11/2021 | Vanderveen | |

OTHER PUBLICATIONS

Atlam, "XACML for Building Access Control Policies in Internet of Things", 2018, IoTBDS, pp. 253-259 (Year: 2018)*
Non-Final Office Action mailed Jul. 3, 2024 for U.S. Appl. No. 17/555,975.
Huseynov, Emin; Seigneur, Jean-Marc, "Physical presence verification using TOTP and QR codes", 2019, 34th International Conference on ICT Systems Security and Privacy Protection.
Abtec, "Head Unit Installation Guide", 2015, Abtec, Retrieved from: archive.org, page date: Jan. 18, 2015. https://web.archive.org/web/20150118042013/https://www.abtec.co.nz/infosheets/HeadUnit.pdf.
Non-Final Office Action mailed Mar. 25, 2024 for U.S. Appl. No. 17/555,975.
Final Office Action mailed Nov. 6, 2024 for U.S. Appl. No. 17/555,975.

* cited by examiner

SYSTEM AND METHOD FOR MAINTAINING REAL ESTATE DATA IN A SECURE MANNER

CROSS-REFERENCE TO RELATED APPLICATIONS

This application claims the benefit of Provisional Patent Application No. 62/128,211 filed Dec. 21, 2020, and titled "System and Method for Maintaining Real Estate Data in a Secure Manner," which is incorporated by reference herein in its entirety.

TECHNICAL FIELD

The present disclosure generally relates to data security, and in particular to data security for real estate data.

BACKGROUND

Information about real estate properties, including land and/or buildings, may be stored online and made accessible to various parties. In some cases, the data is maintained in a private manner, while in other cases the data is made public. As an example, potential homeowners can browse information about various real estate properties on popular online websites that aggregate data about homes. However, it may be difficult to authenticate some of the data, which is often provided by real estate agents or other third parties, and which may be duplicated and provided across a large number of public and/or private services. Moreover, if there are conflicting online records about a property, it may be difficult to determine which record is more accurate.

There is a need in the art for a system and method that addresses the shortcomings discussed above.

SUMMARY

In one aspect, a device for storing real estate data pertaining to a real estate property includes a device housing. The device housing further includes a device processor with device memory for storing real estate data and a communications component for transmitting and receiving real estate data. The device also includes an installation portion configured to be installed at a location of the real estate property. The real estate data stored in the device memory includes information about the real estate property where the device has been installed.

In another aspect, a system for managing real estate data pertaining to a real estate property includes a data management system with a processor and memory, a data storage system for storing real estate data, and a request handler for receiving data requests and responding to data requests. The system also includes an authentication device for generating authentication codes for accessing data from the data management system. The authentication device is installed at a location of the real estate property.

In another aspect, a device for storing real estate data pertaining to a real estate property includes a device housing. The device housing further includes a device processor and device memory for storing real estate data. The device memory further includes restricted real estate data and unrestricted real estate data. The device also includes an installation portion configured to be installed at a location of the real estate property. The restricted real estate data includes information about the real estate property where the device has been installed and where the unrestricted real estate data includes information about the real estate property where the device has been installed. The restricted real estate data is only accessible to users who are located near the device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for maintaining real estate data in a secure manner. This may be accomplished by ensuring that access to the real estate data for a particular property is limited to people who have physical access to the property, as such people (including real estate agents, home owners, inspectors, and other suitable parties) have an inherent interest in maintaining the integrity of the data.

Real estate data can be stored in a real estate data container. The real estate data container can include any relevant real estate data related to construction of the property, parts used in the property, repairs on the property, inspections of the property, and sales (or other financial transactions) associated with the property. A real estate data container may comprise a database, one or more database tables, or any other suitable data structure (or set of data structures) for securely managing and storing real estate data. As described below, in some embodiments, a real estate data container may be stored within a physical data storage unit that is located on the premises associated with the stored real estate data. It may be understood that in some embodiments, data for the same property could be stored in two or more separate data containers or data structures.

In one embodiment, access to the data for a given real estate property is restricted by using an authentication device that is physically located at the same real estate property. The authentication device may provide a rolling authentication code that can be entered by the user requesting access to the data. Any users not located at the physical property, who are therefore unable to find the rolling authentication code, would be unable to access the real estate data for that property. In such an embodiment, a data management system may store real estate data offsite. Additionally, an authentication device may be disposed on the premises and may provide a rolling access code that is used to retrieve the desired real estate data from the remote data management system.

In another embodiment, access to the data for a given real estate property is restricted by using a real estate data unit that is physically stored on the premises. Access to the data may therefore be restricted to users who are close enough to connect with the data unit via wired or wireless communication methods. In such an embodiment, the data unit may include a device housing and an installation portion. The installation portion may be configured to attach to part of a building and/or lot.

Thus, the embodiments provide restricted access to some or all real estate data associated with a property by requiring users to have physical access to that property in order to retrieve and/or modify the data.

Figure 1:
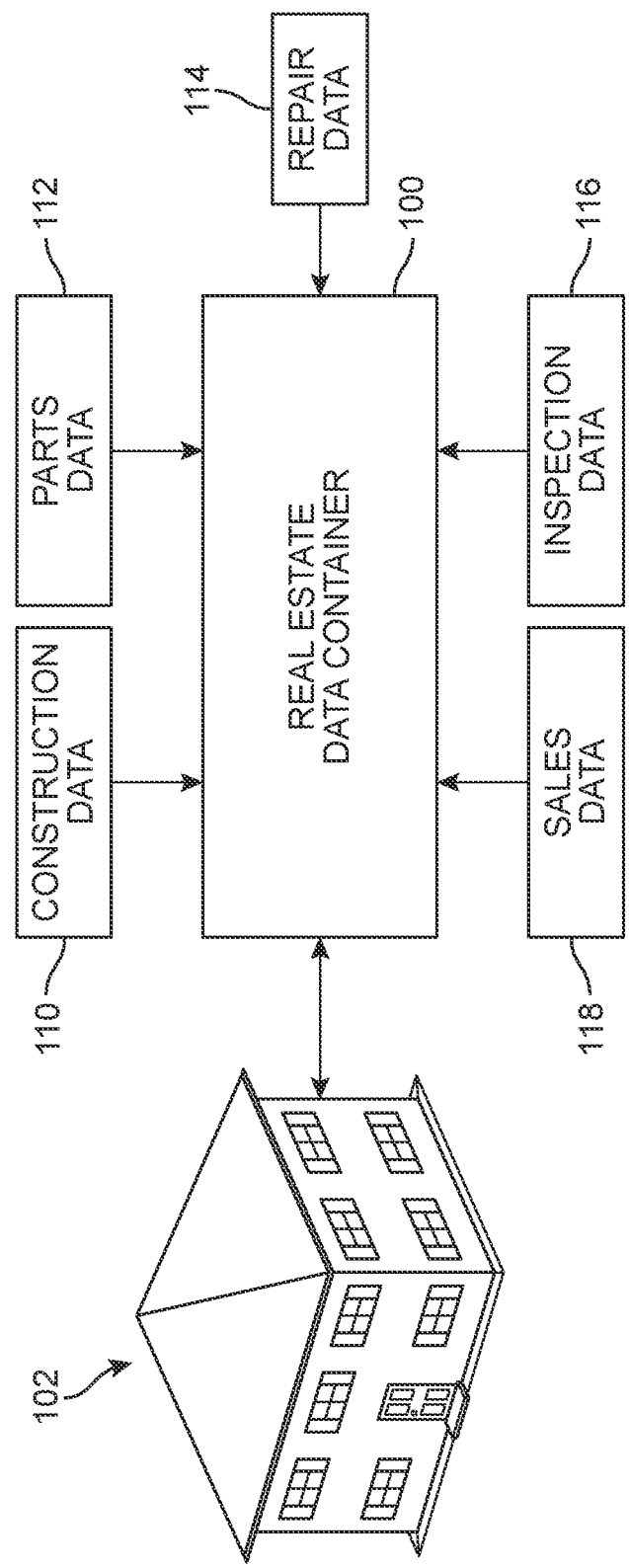
FIG. 1 is a schematic view of a real estate data container that may be associated with a specific real estate property, according to an embodiment.

FIG. 1 is a schematic view of a real estate data container. As used herein, the term "data container" refers to a data structure or collection of data structures for storing predetermined types of information. A real estate data container may comprise one or more data structures for storing information related to a real estate property, such as a house, office building, lot, or other real estate property.

In the exemplary embodiment of FIG. 1, a real estate data container 100 is associated to a home 102. Real estate data container 100 may include various kinds of real estate information about home 102. In this embodiment, this real estate information includes construction data 110, parts data 112, repair data 114, inspection data 116, and sales data 118, which may all be stored within real estate data container 100.

Construction data 110 may include any information about the original construction of the home. Such information may include, but is not limited to: information about the builder and other vendors during the construction process, architectural plans, construction costs, construction timelines, construction materials (such as foundation materials and materials used in the walls, floors, and roof), as well as other suitable construction data. Construction data 110 may also include information about additions or other modifications to the home that occur after the initial construction period.

Parts data 112 may include information about the materials and structures used in the home. Such information may include, but is not limited to: types of flooring (for example, wood, tile, and carpet), types of countertops (such as granite or laminate), specialty fixtures used, HVAC system information, water heater information, gas and electric information, as well as other kinds of amenities or specific parts used in different areas of the home. In some embodiments, the parts data 112 may include an itemized listing of all materials, parts, and systems used during the initial construction of the home. Parts data 112 could then be updated at later times as parts are removed and/or added from the home.

Repair data 114 may include information about any repairs made, either to the structure of the home itself, or to systems in the home (such as the HVAC system). Repair data may include information about the type of repair made, date of repair, as well as information about the party making repairs (such as information about an HVAC repair business).

Inspection data 116 may include information related to various kinds of inspections. These could include inspections made prior to sale of the house, as well as inspections made for purposes of insuring the property. Inspection information could include the inspecting party information, inspection date, and any information reported as part of the inspection process.

Sales data 118 may include any information related to financial transactions associated with the home. These could include not only sales of the home, but also rental transactions. As an example, if a home is used as a temporary rental via a house sharing service, information about each short-term rental period (for example, 2-3 days) could be stored as part of sales data 118.

Figure 2:
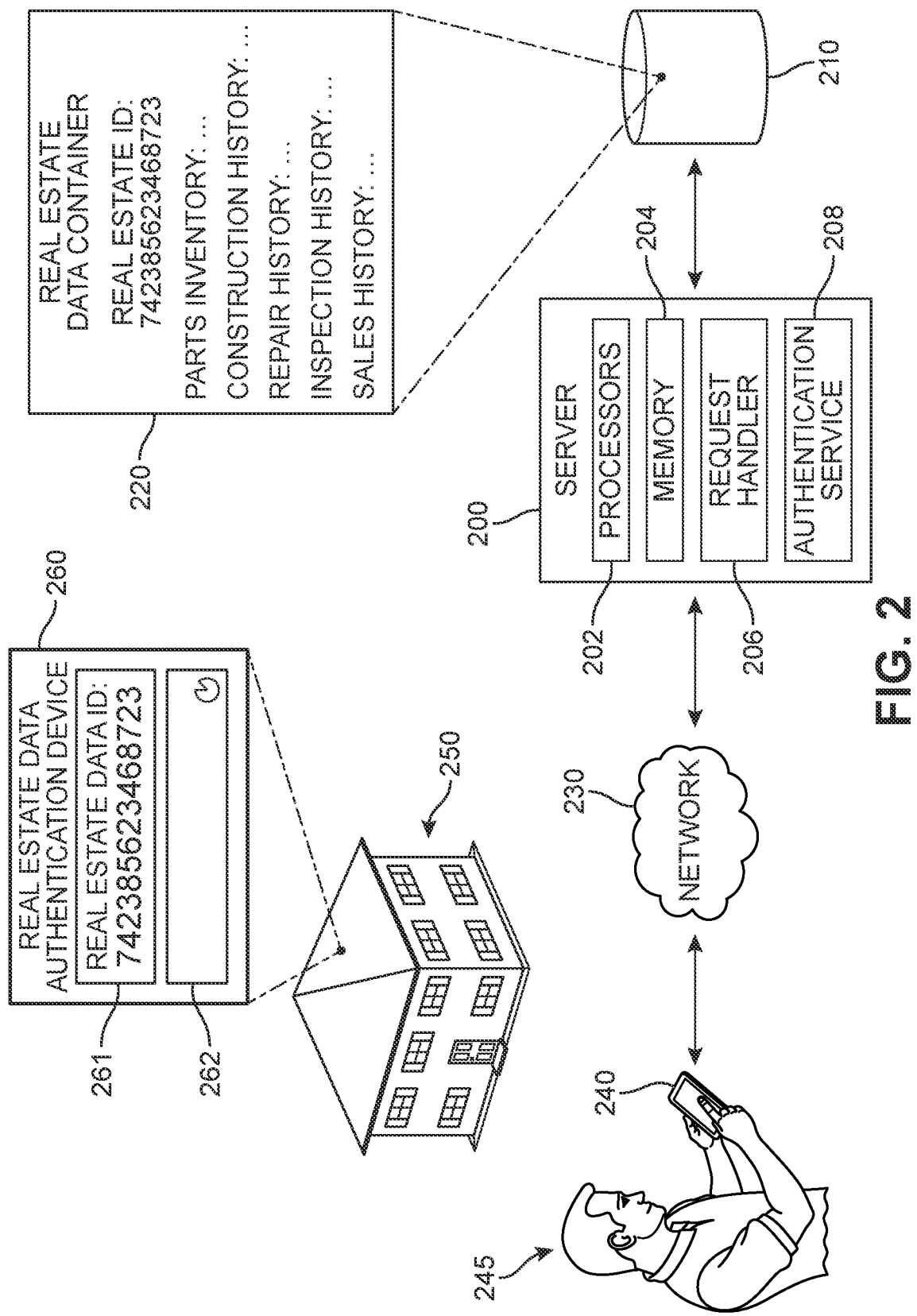
FIG. 2 is a schematic view of a system of restricting access to real estate data for a particular property using an authentication device, according to an embodiment.

FIG. 2 is a schematic view of a system for managing real estate data, according to an embodiment. As seen in FIG. 2, in one embodiment real estate data containers may be stored on a host system, such as a server 200. Server 200 may comprise processors 202 and memory 204. Memory 204 may comprise a non-transitory computer readable medium. Instructions stored within memory 204 may be executed by the one or more processors 202.

Server 200 may communicate with a database 210. Database 210 may be any suitable kind of database for storing real estate data containers such as data container 220. Server 200 may communicate, via a network 230, with a mobile client running on a device 240. In the exemplary embodiment, device 240 could be a mobile phone, tablet, or other suitable mobile computing device. Network 230 could be any suitable kind of network including any suitable kinds of wireless networks. In one embodiment, network 230 could be a wide area network.

Information from a real estate data container can be accessed by a mobile client running on device 240. Specifically, a request may be made to a request handler 206, which runs on server 200. Request handler 206 may route the request for data to an appropriate service running on server 200. To facilitate requests that require authentication, server 200 may further include an authentication service 208.

To restrict access to some or all of the real estate data in real estate data container, the embodiment includes a real estate data authentication device 260, also referred to simply as authentication device 260. As described in further detail below, authentication device 260 may be disposed on the premises of a real estate property 250. It may be appreciated that a single house is shown for real estate property 250 in this example, but more broadly a real estate property can comprise one or more buildings or related structures, as well as the lot on which the properties are located. Moreover, in some cases, a real estate property could comprise a lot with no buildings or other man-made structures.

Authentication device 260 may be disposed in a location that is accessible to user 245. User 245 represents any of a number of parties who may have interest in this data, including, but not limited to: real estate agents, inspectors, the owner of the property, a tenant of the property, a potential buyer of the property, as well as possibly other suitable users who have a legitimate need to see some or all of the data.

In some embodiments, an authentication device may comprise a hardware based security key that provides a one-time password (OTP). A one-time password may be alternatively rereferred to as a one-time pin or dynamic password. Using a one-time password allows a password to be generated for a single login session. Embodiments could use authentication devices employing any known methods of generating one-time passwords, including time-synchronization methods and mathematical algorithmic methods.

In the exemplary embodiment, using a one-time password allows users who are located at the real estate property to obtain access to associated real estate information, but prevents such users from obtaining access when they are away from the property as they no longer have access to the one-time passwords that are generated at the authentication device on premises.

In the embodiment of FIG. 2, authentication device 260 may further include a real estate data ID label 261 and a display screen 262 for displaying one-time passwords that are continuously refreshed. In some cases, upon sending a request for data about the real estate property where a user is located, the user could submit the real estate ID to indicate the desired property. The user could also submit the one-time password generated by the authentication device on display 262 to confirm they are present on the premises at the time of the request.

Figure 3:
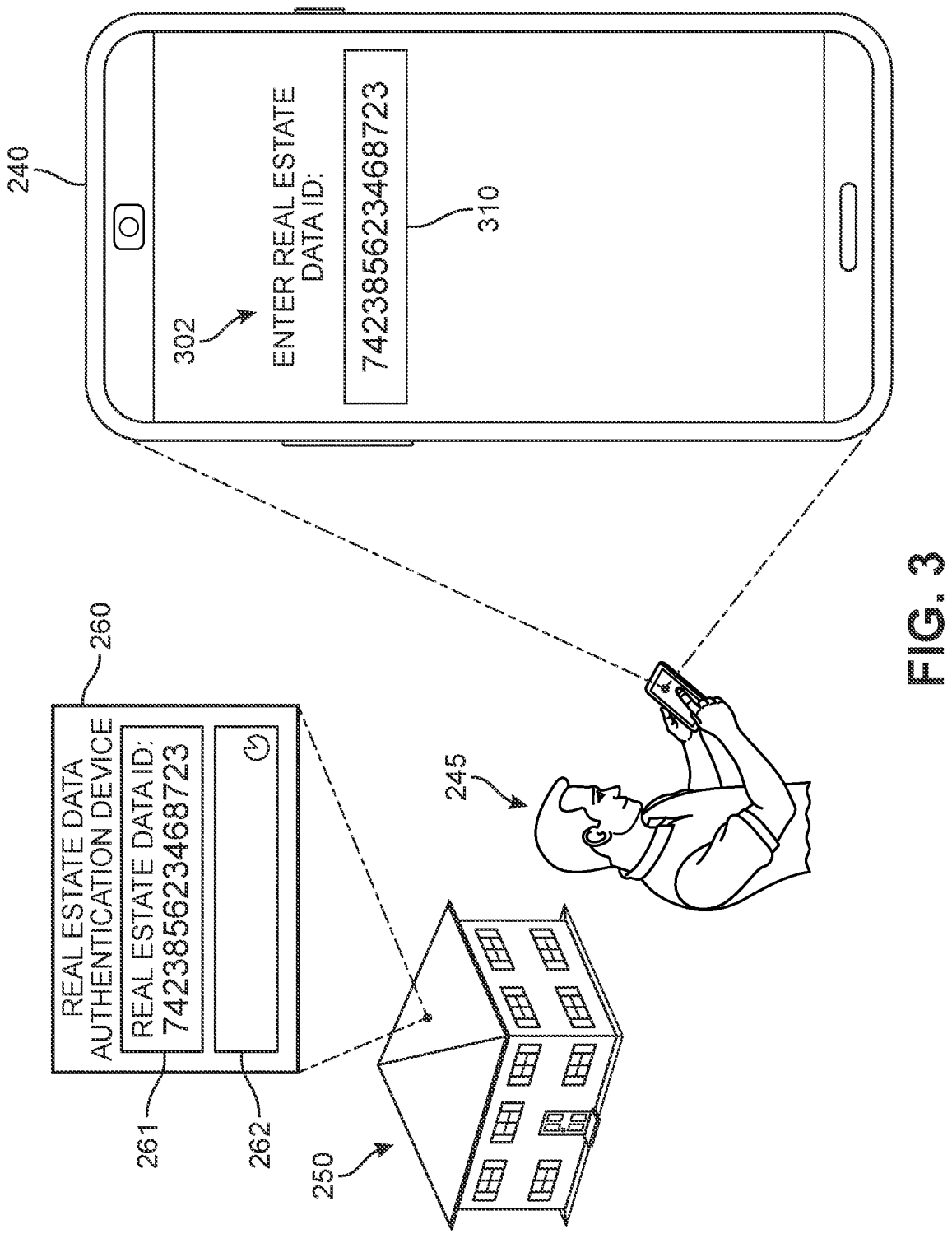
FIG. 3 is a schematic view of a step of entering a real estate ID into an application, according to an embodiment.
Figure 4:
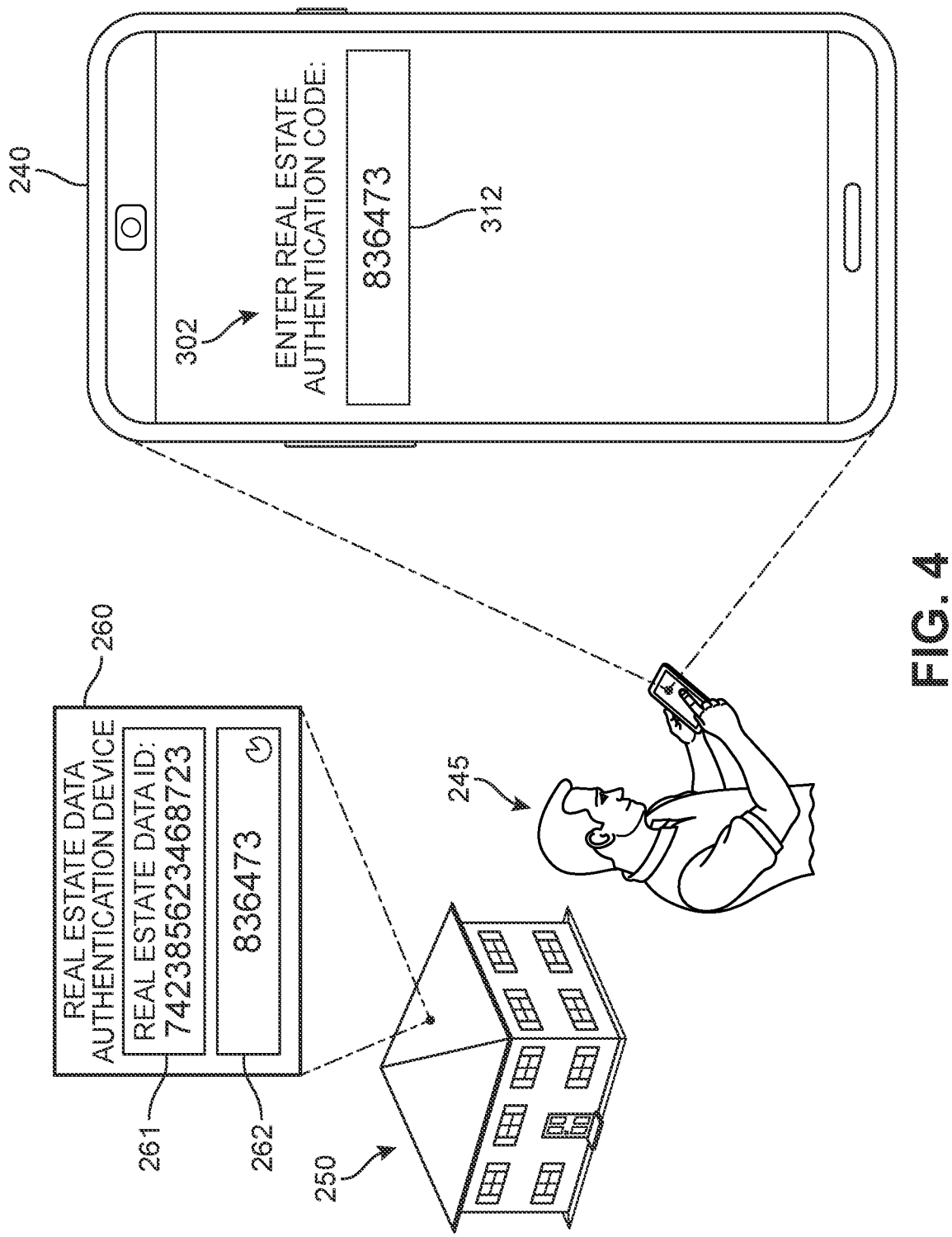
FIG. 4 is a schematic view of a step of entering an authentication code into an application, according to an embodiment.

As seen in FIGS. 3-4, user 245 may request access to restricted real estate data for the given property by using a suitable mobile application 302 that runs on device 240 (such as a user's phone). Mobile application 302 may present user 245 with input fields including a real estate data ID field 310, as shown in FIG. 3. In some cases, user 245 may retrieve the real estate data ID for the property by reading the ID off of authentication device 260. Once the ID has been entered, mobile application 302 may prompt user 245 to enter an authentication code into field 312, as shown in FIG. 4. This code may be dynamically generated at authentication device 260 and read off a display screen 262 of the device. In some cases, the code is refreshed at regular periods (such as every 30 seconds) so that users who visit the property at one time cannot use the same access code when they are no longer on the property.

Once the ID and authentication code have been entered, the authentication code may be checked by authentication service 208. If the code is correct, user 245 may be given access to the real estate data associated with property 250. That is, the associated real estate data can be retrieved from server 200 (see FIG. 2) and transferred to the mobile application running on the user's device. If the code is incorrect, however, user 245 may be denied access to the real estate data associated with property 250.

In different embodiments, providing a user with access to the data could include providing them read and/or write permissions. That is, depending on the intended use of the system, a user could only be given to retrieve data from the system but not add or delete data. In other cases, a user could be given permission to add or delete data. In some cases, permission to add or remove data could be given to users who are able to submit additional credentials indicating that they are, for example, an owner of the home, a real estate agent, or another suitable party with permission to edit the data.

Figure 5:
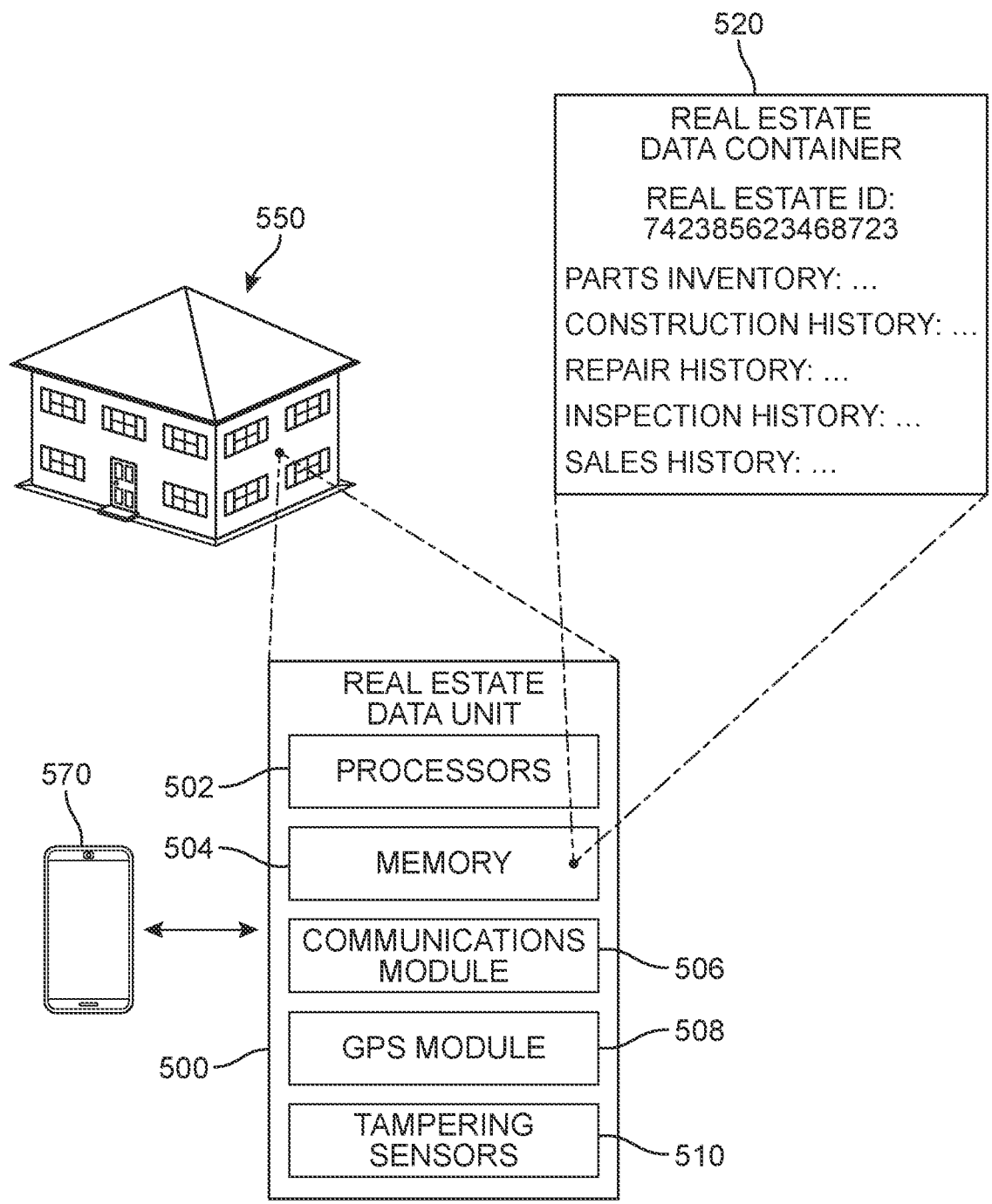
FIG. 5 is a schematic view of a system of restricting access to real estate data for a particular property using an on-premises real estate data unit, according to an embodiment.

FIG. 5 is a schematic view of a system for managing real estate data, according to an embodiment. In the exemplary embodiment of FIG. 5, some or all of the real estate data associated with a real estate property may be stored in a real estate data unit that is located on the premises of the real estate property.

As seen in FIG. 5, real estate data containers 520 may be stored in a real estate data unit 500, also referred to simply as data unit 500. Data unit 500 comprises a physical unit that may be located on the premises of a property 550. Data unit 500 may comprise processors 502 and memory 504. Memory 504 may comprise a non-transitory computer readable medium. Instructions stored within memory 504 may be executed by the one or more processors 502.

Real estate data containers, such as real estate data container 520, may be stored locally within memory 504. In different embodiments, data can be stored in any suitable format including, but not limited to, database tables.

Figure 6:
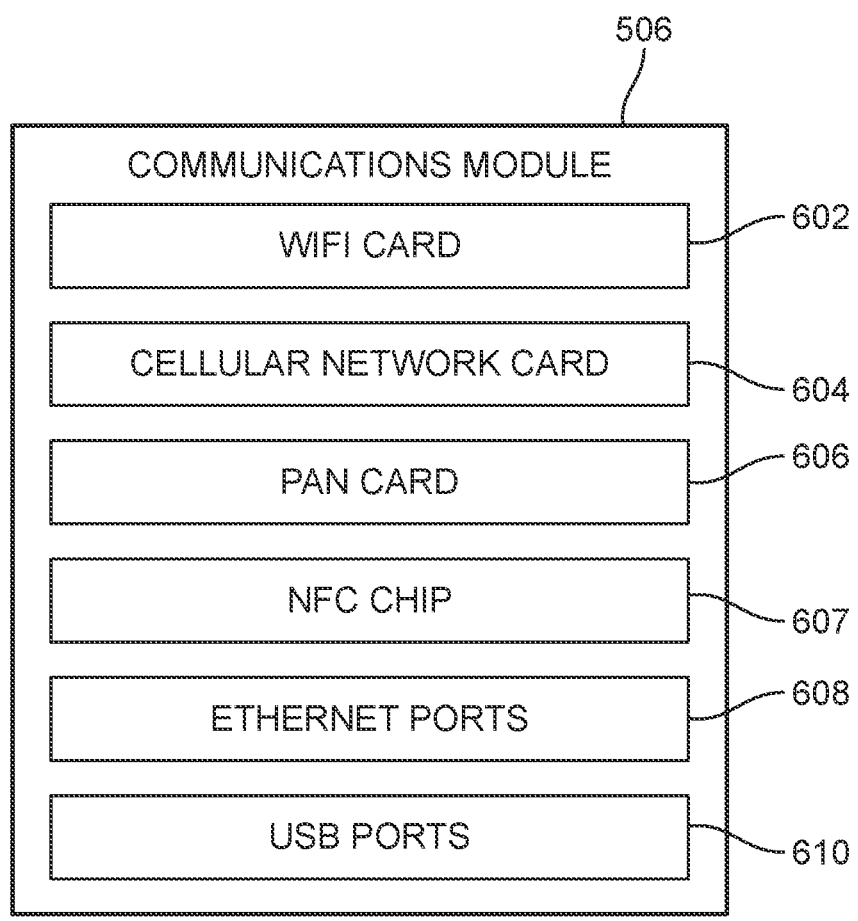
FIG. 6 is a schematic view of a communications module, according to an embodiment.

Data unit 500 may further include a communications module 506, which facilitates transmission of data between data unit 500 and one or more external devices. Communications module 506 may include one or more communication components that each facilitate a particular kind of communication mode and/or protocol. As seen in FIG. 6, communications module 506 may comprise a Wi-Fi card 602, a cellular network card 604, a Personal Area Network (PAN) card 606, a Near Field Communication (NFC) chip 607, one or more ethernet ports 608, and one or more USB ports 610.

Wi-Fi card 602 may comprise any hardware capable of communicating with nodes in a wireless network using the IEEE 802.11 standards. In some cases, Wi-Fi card 602 may comprise a wireless network interface controller (WNIC).

Cellular network card 604 may comprise any hardware capable of communicating with other nodes in a cellular network. The components may be configured to communicate using one or more known cellular technologies such as Global System for Mobile Communications (GSM) and Code-Division Multiple Access (CDMA).

Personal Area Network (PAN) card 606 may comprise any hardware capable of communicating with nodes in a personal area network. PAN card 606 may be configured for specific protocols such as Bluetooth.

Near Field Communications (NFC) chip 607 may comprise hardware components that facilitate communication over very short distances (such as at a distance of 0 to 4 cm). Additionally, ethernet ports 608 and USB ports 610 may facilitate wired communications that require a user to have physical access to the ports on data unit 500. Using NFC and/or wired communication methods could help ensure that only people with direct physical access to data unit 500 can access the locally stored real estate data.

It may be appreciated that in some embodiments some of these communication components may be optional, while other embodiments may include additional communication components. Moreover, in some embodiments, one or more of these components could be stand-alone hardware elements disposed in data unit 500. In other embodiments, one or more of these components may be integrated components within a System on a Chip (SoC).

Embodiments can include provisions to ensure data unit 500 is not moved off premises and/or otherwise tampered with, to help maintain the integrity of the data stored within data unit 500.

Some embodiments may include GPS module 508. GPS module 508 comprises any module capable of determining a GPS location for data unit 500. In some cases, GPS module 508 could determine a position for the unit based solely on signals from GPS satellites. However, in other cases, especially when data unit 500 may be located inside a house, GPS module 508 may utilize other known methods for estimating a GPS position based on, for example, signals from nearby cell towers.

Some embodiments may also include tampering sensors 510. Tampering sensors 510 may comprise one or more sensors configured to detect tampering with the data unit. As one example, tampering sensors 510 could be sensors that detect when the housing of the data unit is opened. As another example, tampering sensors 510 may be acceleration sensors that detect when abnormal forces are applied to the data unit.

Figure 7:
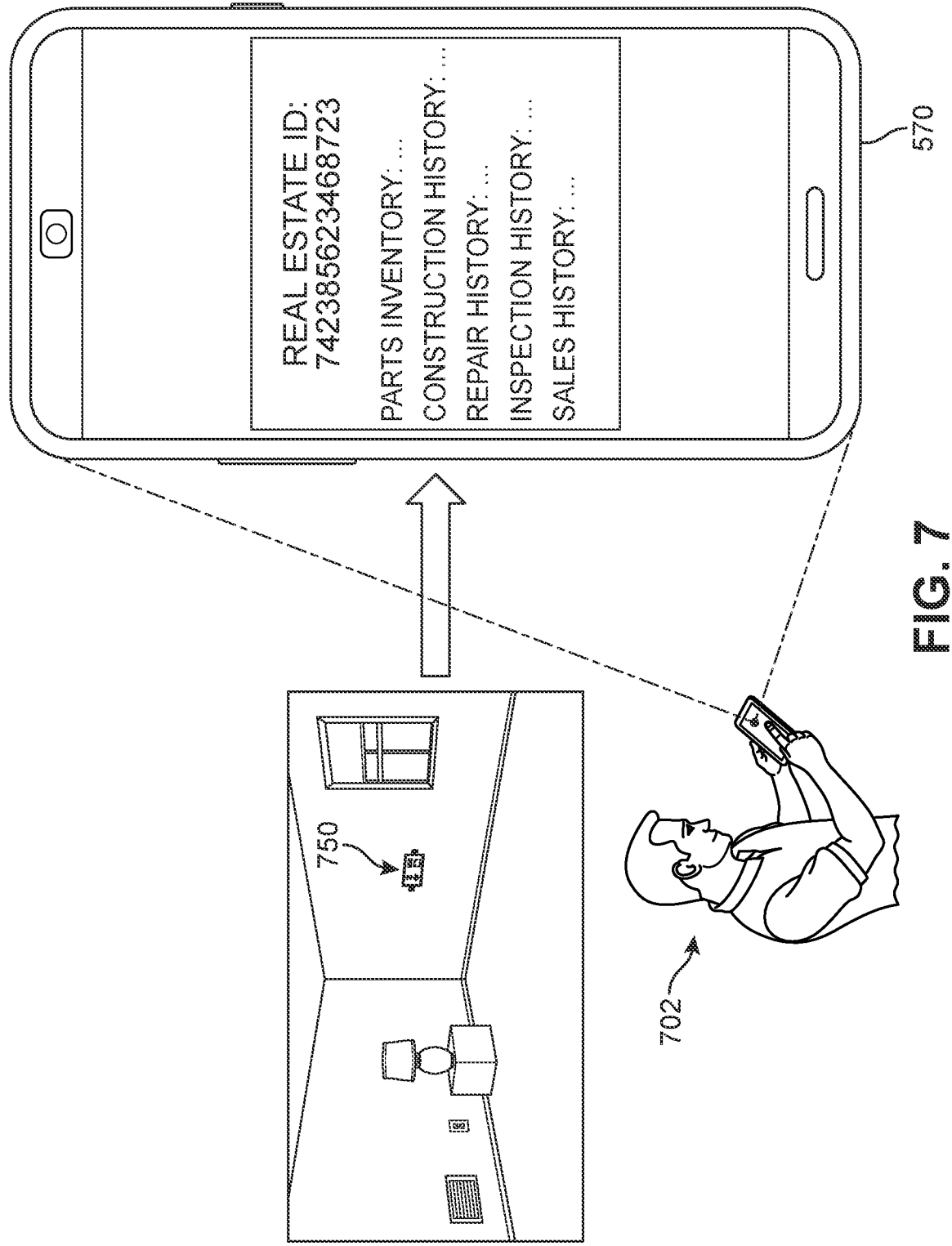
FIG. 7 is a schematic view of a step of retrieving real estate information from a local real estate data unit, according to an embodiment.

Information from a real estate data container can be accessed by a mobile client running on device 570, as seen in FIG. 5. Communication may be wired or wireless and may be facilitated by one or more components within communications module 506. As already discussed, access to data unit may be restricted to devices in a predetermined communication range, which may be related to the mode of communication used. As an example, FIG. 7 depicts a schematic view depicting a user 702 retrieving real estate data directly from a data unit 750 that has been installed in a home (property 550).

The embodiments may include provisions for attaching a real estate data unit to a portion of a property (either a building, other structure, or the lot itself). To this end, each real estate data unit may include both a housing for storing the components described above and shown in FIG. 5, as well as an installation portion. As used herein, the term "installation portion" refers to any structures of a data unit that facilitate installing the data unit in place within a building, other structure, or lot.

Figure 8:
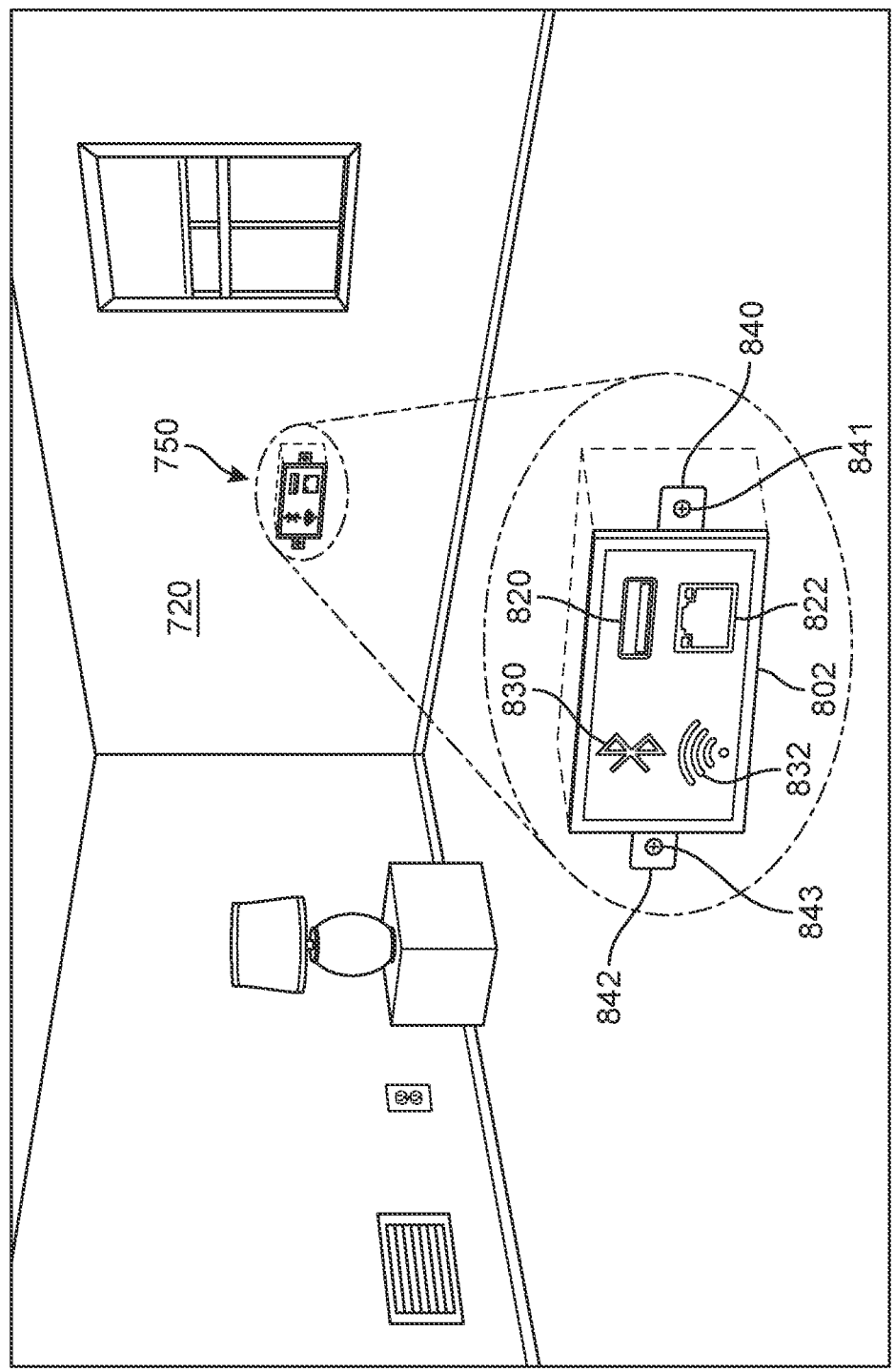
FIG. 8 is a schematic view of a real estate data unit installed inside a home, according to an embodiment.

As seen in FIG. 8, data unit 750 includes housing 802 for housing internal components, including memory for storing real estate data. The outside of data unit 750 may include various physical ports for providing access to the internal memory. These include, for example, USB port 820 and ethernet port 822. Additionally, data unit 750 may include a first indicia 830 indicating Bluetooth access, as well as a second indicia 832 indicating WiFi access. Although not shown, some embodiments could also include an indicia indicating NFC access.

Data unit 750 further includes a first installation portion 840 and a second installation portion 842. Each of these installation portions may comprise a bracket with an opening to receive a fastener (such as screw 841 and screw 843). The brackets with fasteners are used to install data unit 750 into place in wall 720.

Although the exemplary embodiment shows data unit 750 exposed on interior wall 720, in other embodiments data unit 750 could be covered by a panel door. In other embodiments, data unit 750 could be placed in a utility room along with other exposed systems such as the HVAC system and water heater, so as not to be visible to most visitors of the home.

Figure 9:
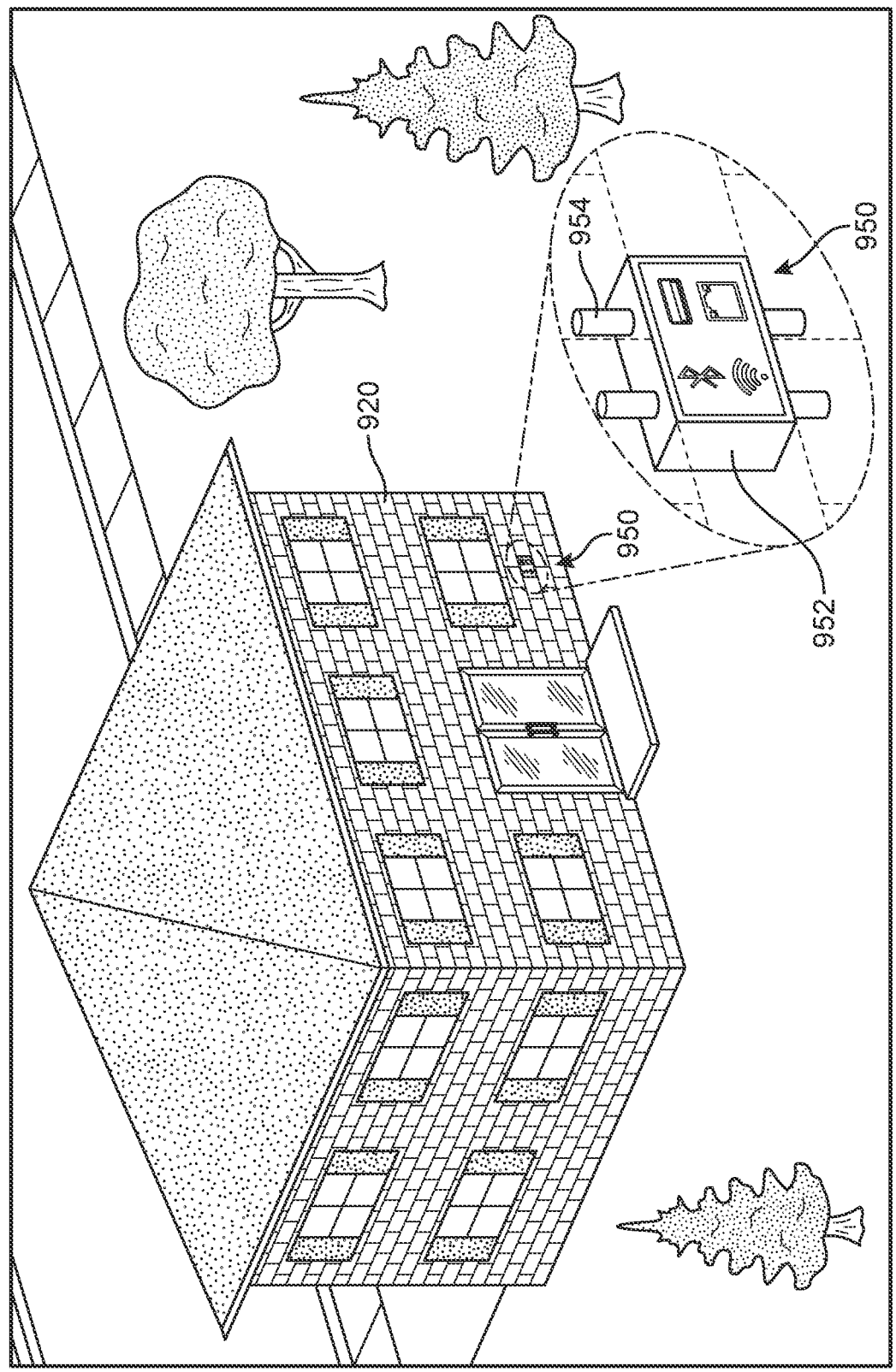
FIG. 9 is a schematic view of a real estate data unit installed along the exterior of a home, according to an embodiment.

FIG. 9 depicts another embodiment where a data unit 950 has been installed within the exterior wall 920 of a property 900. In this case, exterior wall 920 is comprised of bricks. Thus, data unit 950 includes a housing 952 and installation pegs 954. Installation pegs 954 extend upwardly and downwardly and may be fit into corresponding holes in the upper and lower bricks. Optionally, in some cases, a removable cover could be placed over data unit 950 to hide its presence and/or limit its exposure to the elements.

It may be appreciated that the installation modes described herein may apply not only to data units, but also to data authentication units, such as those described above and shown in FIGS. 2-4. Thus, for example, a data authentication device could be installed along the interior wall of a house (as in FIG. 8). Likewise, a data authentication device could be installed along an exterior wall of a house (as in FIG. 9).

Embodiments may include provisions for installing data units and/or data authentication units into the ground of a property. This allows a data unit to be maintained independently of the structures built on the property. Moreover, this allows data units to be physically installed at a property with no existing structures, which allows data for a lot (such as data about sales of the lot) to be tracked in a secure manner.

Figure 10:
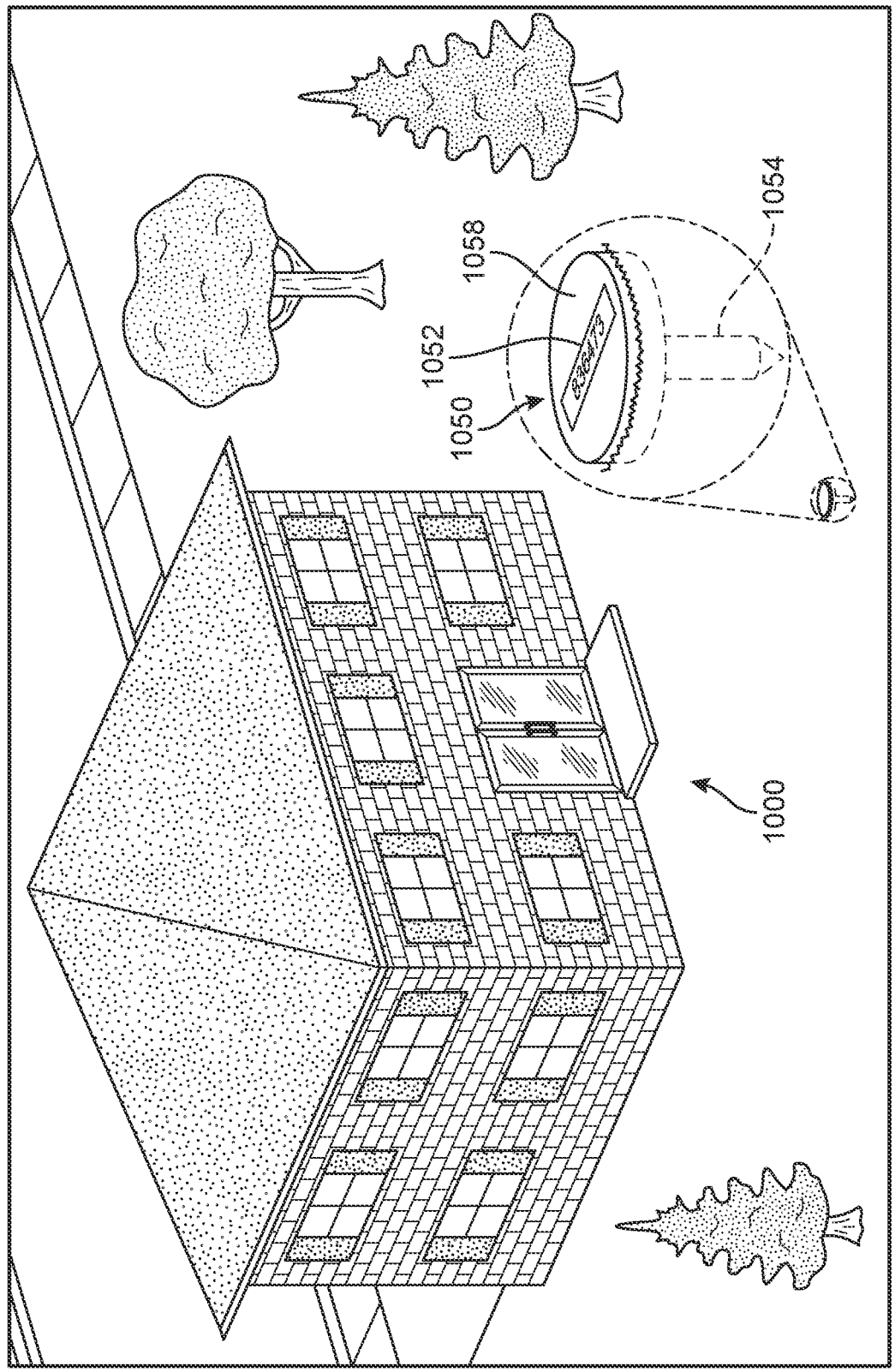
FIG. 10 is a schematic view of an authentication device installed in the ground on a property, according to an embodiment.

FIG. 10 depicts an embodiment where a data authentication device 1050 has been installed into the ground of a property 1000. In this case, authentication device 1050 includes a housing 1052, which further includes a screen for showing rolling access codes. The housing may include any of the components described above and shown in FIG. 2 for an authenticating system. Additionally, authentication device 1050 includes an installation portion. In the exemplary embodiment the installation portion comprises a stake 1054 that is driven into the ground, while an upper surface 1058 of the authentication device 1050 is exposed along the ground.

It may be appreciated that in other embodiments, a property could have two or more data units. For example, a property could have one data unit for each physical structure on the premises, and one data unit for the lot. Likewise, a property could have two or more authentication devices that facilitate accessing separate data containers for structures as well as the lot of a property.

Embodiments can also include provisions to allow for both restricted and non-restricted data. For example, some data may be publicly available while other data remains only accessible for users with physical access to the property. For example, a homeowner may want information such as sales information and construction information for their property made publicly available to websites that provide house listings for sale, but the homeowner may want to keep repair data and inspection data limited to only users who have physical access to the property.

Figure 11:
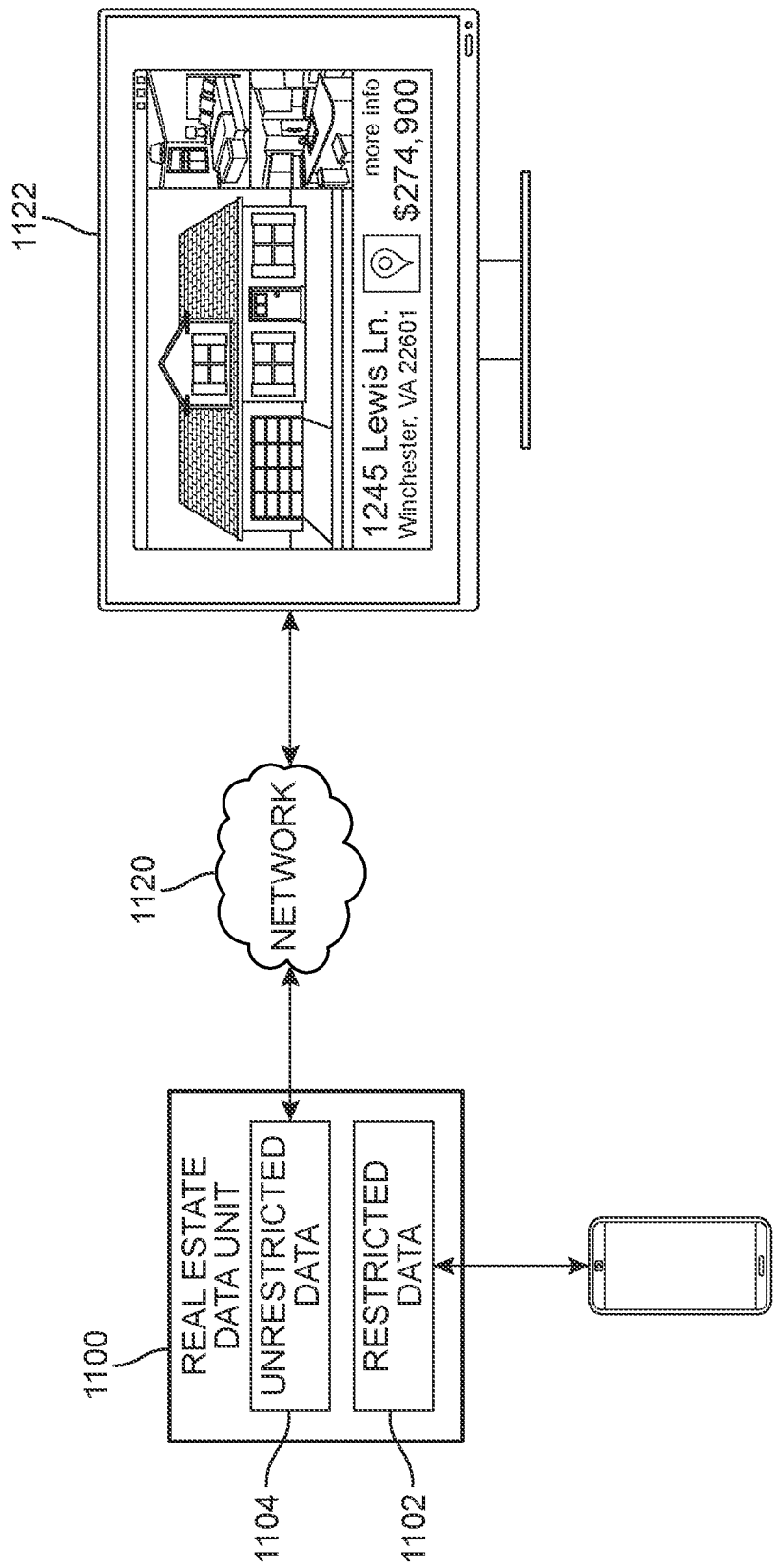
FIG. 11 is a schematic view of a system for providing both restricted and unrestricted data for a real estate data unit, according to an embodiment.

In one exemplary embodiment shown in FIG. 11, data within a real estate data unit 1100 can be separated into restricted data 1102 and unrestricted data 1104. In some embodiments, restricted data 1102 and unrestricted data 1104 may be stored on distinct memory devices. In other embodiments, restricted data 1102 and unrestricted data 1104 may be separated virtually by a data management system operating as part of a data unit. In one embodiment, to ensure security for the restricted data, restricted data could be stored on a standalone memory device within data unit 1100, which is connected to a communications component that can only be accessed by other proximate devices (such as a user's phone or laptop).

Restricted data 1102 may only be available for users who have physical access to the property and therefore can connect directly to the data unit 1100 via wired or wireless methods. However, unrestricted data 1104 may be accessible by users located away from the property over a wide area network 1120 (as well as via a local connection). This unrestricted data can then be accessed remotely and used by remote parties to populate real estate listings (for example, listing 1122), or for other suitable purposes.

In some embodiments, restricted data 1102 may only be made available to devices that can connect to a local network generated by a communications component of real estate data unit 1100. For example, real estate data unit 1100 could include an Ethernet port (and associated Ethernet card) that can be used to establish a physical network between real estate data unit 1100 and a user's device. Alternatively, real estate data unit 1100 could include a WiFi card that can be used to establish a wireless local area network that can be joined by nearby devices. In still other cases, real estate data unit 1100 could include a Bluetooth card (or other personal area networking component) to establish a personal area network with nearby devices. In still other cases, only devices that can connect to the data unit via NFC may be granted access to the restricted real estate data. By limiting access to devices that are able to connect via local area networks, personal area networks, or direct connections such as NFC, the embodiments ensure that restricted real estate data can only be transmitted or received by users with physical access to the property. By contrast, unrestricted real estate data may be made available to users connected to the data unit via any kind of network, including a wide area network such as the Internet.

Figure 12:
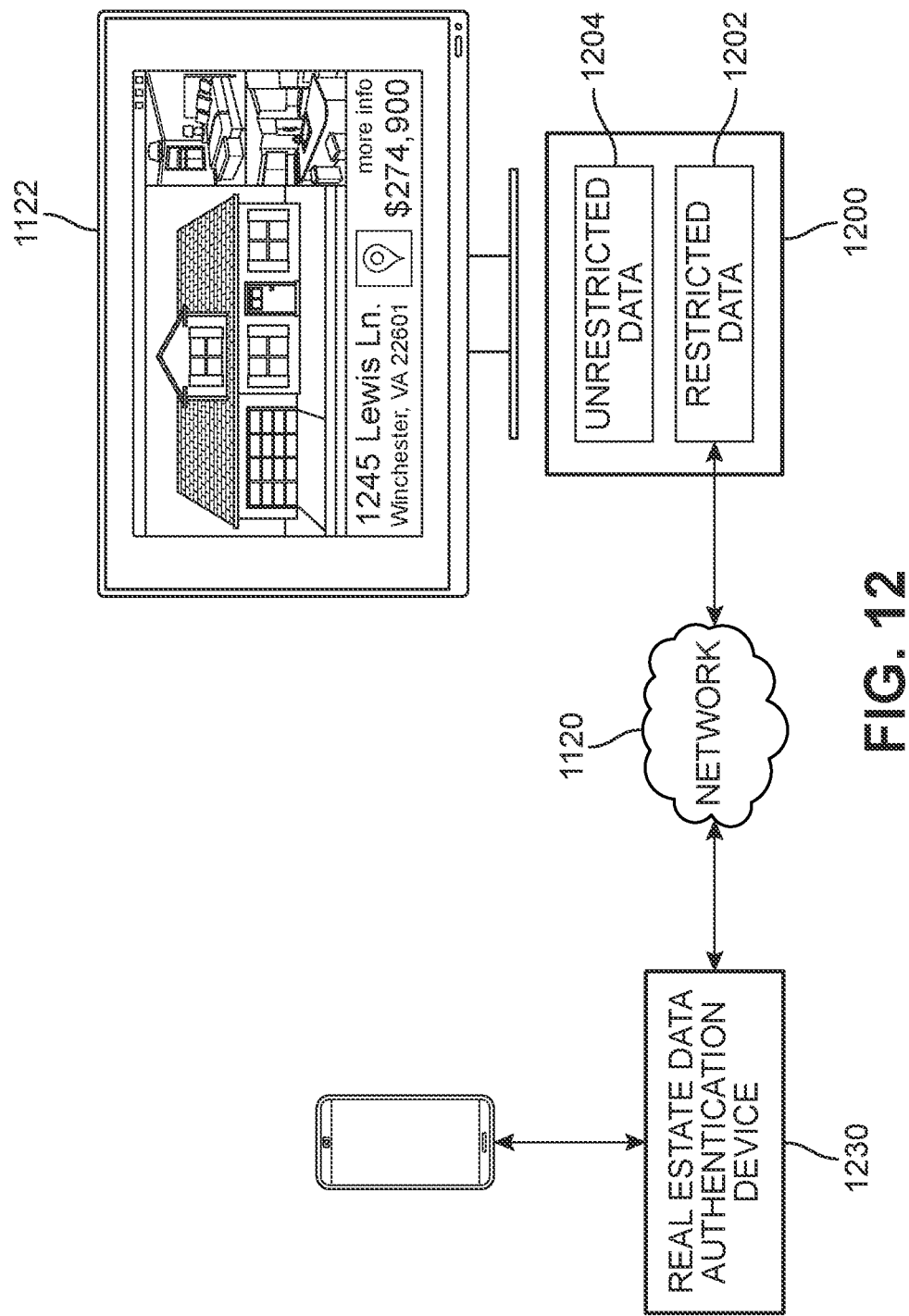
FIG. 12 is a schematic view of a system for providing both restricted and unrestricted data on a server, where the restricted data is accessible using an authentication code, according to an embodiment.

In another embodiment shown in FIG. 12, real estate data that is stored remotely on a server 1200 can be separated into restricted data 1202 and unrestricted data 1204. Restricted data 1202 may only be available for users who have physical access to the property and therefore can provide an authentication code from authentication device 1230 when requesting data. However, unrestricted data 1204 may be accessible by any users, even those without an authentication code. This unrestricted data can then be made accessible to any parties who have a suitable use for it, even when those parties are not located on the premises.

It may be appreciated that in some embodiments, the real estate data described herein could be stored on a blockchain or other immutable ledger that tracks the history of changes to the data so that all changes are transparent to the users. For example, in one embodiment, rather than storing data in a centralized location on a remote server, the real estate data could be stored in a decentralized ledger. In order to make changes to data on the decentralized ledger for a particular property, users would need an authentication code that would be accessible at an authentication device located at the property.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An authentication device for storing real estate data pertaining to a real estate property, comprising:
   a device housing, the device housing including:
      a device processor;
      device memory for storing the real estate data;
      a communications component for receiving the real estate data and transmitting the real estate data to a mobile computing device associated with a user;
      a hardware based security key, the hardware based security key being configured to generate a one-time password in response to receiving an electronic request for the real estate data from the mobile computing device;
      the communication component being configured to transmit the real estate data to the mobile computing device upon receiving confirmation data from the mobile computing device that confirms the one-time password, the communication component including at least of a USB port and an ethernet port, the transmission of the real estate data to the mobile computing device being done via a wired electronic communication using the one of the USB port and the ethernet port;
   a display screen for displaying the one-time password to a user;
   an installation portion configured to allow the authentication device to be installed at a location of the real estate property, the installation portion including a stake portion that is configured to be driven into a ground of the premises of the real estate property;
   a GPS module that is configured to determine a location of the authentication device and ensure that the authentication device is not moved off of the premises of the real estate property; and
   a tampering sensor that is configured to determine whether the authentication device has been tampered with;
   wherein the real estate data stored in the device memory includes information about the real estate property where the device has been installed.

2. The device according to claim 1, wherein the one-time password generated by the hardware based security key is further configured to expire after a single login session.

3. A system for managing real estate data pertaining to a real estate property, comprising:
   a data management system, the data management system further including:
      a processor and memory;
      a data storage system for storing the real estate data, the real estate data including each of including each of a parts inventory, a construction history, a repair history, an inspection history, and a sales history for the real estate property where the device has been installed;
      a request handler for receiving data requests and responding to data requests; and
   an authentication device including a display screen for generating authentication codes for accessing data from the data management system in the form of displaying a one-time password on the display screen, the one-time password being refreshed and displayed on the display screen at a regular predetermined time period;
   wherein the authentication device is installed at a location of the real estate property, and the authentication device further comprises
      a communications component including at least of a USB port and an ethernet port, configured to transmit data from the authentication device via a wired electronic communication using the one of the USB port and the ethernet port;
      a GPS module that is configured to determine a location of the authentication device and ensure that the authentication device is not moved off of the premises of the real estate property,
      an installation portion including a stake portion that is configured to be driven into a ground of the premises of the real estate property, and a upper surface portion that includes the display screen, and
      a tampering sensor that is configured to determine whether the authentication device has been tampered with.

4. The system according to claim 3, wherein the real estate data is selected by an owner of the real estate property.

5. The device according to claim 3, wherein:
   the one-time password generated by the hardware based security key is further configured to expire after a single login session.

6. An authentication device for storing real estate data pertaining to a real estate property, comprising:
   a device housing, the device housing further including:
      a device processor;
      device memory for storing the real estate data, wherein the real estate data includes restricted real estate data, unrestricted real estate data, and third party submitted data;
   an installation portion configured to allow the authentication device to be installed at a location of the real estate property, including a stake portion that is configured to be driven into a ground of the premises of the real estate property;
   a communications component configured to receive an electronic request for the real estate data including at least of a USB port and an ethernet port, configured to transmit the real estate data from the device via a wired electronic communication using the one of the USB port and the ethernet port;
   a display screen for generating authentication codes for accessing the real estate data in the form of displaying a one-time password on the display screen;

a GPS module that is configured to determine a location of the authentication device and ensure that the authentication device is not moved off of the premises of the real estate property; and a tampering sensor that is configured to determine whether the authentication device has been tampered with;

wherein the restricted real estate data includes first information about the real estate property where the authentication device has been installed and wherein the unrestricted real estate data includes second information about the real estate property where the device has been installed;

wherein the restricted first information is selected by an owner of the real estate property, and the unrestricted second information is also selected by the owner of the real estate property;

wherein the third party submitted data is generated and added to the device memory by a suitable third party after the third party has submitted credentials to the device processor authorizing them to add the third party submitted data to the device memory;

wherein the restricted real estate data and the third party submitted data are only accessible to users who are located near the authentication device.

* * * * *